(12) United States Patent
Chang et al.

(10) Patent No.: US 8,372,522 B2
(45) Date of Patent: Feb. 12, 2013

(54) COMPOSITE ARTICLES MADE BY PROCESS FOR JOINING BRASS PART AND SILICON CARBIDE CERAMIC PART

(75) Inventors: Hsin-Pei Chang, New Taipei (TW); Wen-Rong Chen, New Taipei (TW); Huann-Wu Chiang, New Taipei (TW); Cheng-Shi Chen, New Taipei (TW); Wen-Feng Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/172,271

(22) Filed: Jun. 29, 2011

(65) Prior Publication Data

US 2012/0148867 A1    Jun. 14, 2012

(30) Foreign Application Priority Data

Dec. 14, 2010    (CN) .......................... 2010 1 0587320

(51) Int. Cl.
  *B32B 15/04*    (2006.01)
  *B32B 15/20*    (2006.01)
  *B32B 18/00*    (2006.01)

(52) U.S. Cl. ........ 428/627; 428/610; 428/628; 428/660; 428/680; 428/674; 428/675

(58) Field of Classification Search ................. 428/610, 428/627, 628, 660, 661, 658, 680, 674, 671, 428/675, 446, 450
See application file for complete search history.

(56) References Cited

U.S. PATENT DOCUMENTS 8,153,272 B1 *    4/2012    Chang et al. .................. 428/621
2012/0141824 A1 *    6/2012    Chang et al. .................. 428/623

FOREIGN PATENT DOCUMENTS

JP    61-227972 A    * 10/1986

OTHER PUBLICATIONS

Abstract, Toshiba, JP 61-227972 A, Oct. 1986.*
Translation, Kameda, et al., JP 61-227972, Oct. 1986.*

* cited by examiner

*Primary Examiner* — Michael La Villa
(74) *Attorney, Agent, or Firm* — Altis Law Group, Inc.

(57) ABSTRACT

A process for joining a brass part and a silicon carbide ceramic part comprising: providing a brass part, a SiC ceramic part, a Ti foil and a Ni foil; placing the SiC ceramic part, the Ti foil, the Ni foil, and the brass part into a mold, the Ti foil and the Ni foil located between the SiC ceramic part and the brass part, the Ti foil abutting against the SiC ceramic part, the Ni foil abutting against the brass part and the Ti foil; placing the mold into a chamber of an hot press sintering device, heating the chamber and pressing the brass part, the SiC ceramic part, the Ti foil, and the Ni foil at least until the brass part, the SiC ceramic part, the Ti foil and the Ni foil form a integral composite article.

5 Claims, 2 Drawing Sheets

COMPOSITE ARTICLES MADE BY PROCESS FOR JOINING BRASS PART AND SILICON CARBIDE CERAMIC PART

CROSS-REFERENCE TO RELATED APPLICATIONS

The disclosures of the three listed applications are incorporated by reference in this instant application. All listed applications have the same assignee.

| Ser. No. | Title | Inventors | Current Status |
|---|---|---|---|
| 13/172,264 | PROCESS FOR JOINING STAINLESS STEEL PART AND ZIRCONIA CERAMIC PART AND COMPOSITE ARTICLES MADE BY SAME | HSIN-PEI CHANG et al. | U.S. Pat. No. 8,252,429 |
| 13/172,274 | PROCESS FOR JOINING BRONZE PART AND SILICON CARBIDE CERAMIC PART AND COMPOSITE ARTICLES MADE BY SAME | HSIN-PEI CHANG et al. | Pending |
| 13/172,280 | PROCESS FOR JOINING BRASS PART AND SILICON CARBIDE CERAMIC PART AND COMPOSITE ARTICLES MADE BY SAME | HSIN-PEI CHANG et al. | U.S. Pat. No. 8,153,272 |

BACKGROUND

1. Technical Field

The present disclosure relates to a process for joining a metal part and a ceramic part, especially to a process for joining a brass part and a silicon carbide ceramic part, and a composite article made by the process.

2. Description of the Related Art

It is desirable to join brass parts and silicon ceramic parts. A typical process for joining brass and silicon ceramic is by positioning physically separate nickel foil or molybdenum foil as intermediate layer between brass and silicon ceramic. However, the foil retains its separate nature through manufacturing and in the final product and does not chemically chemically interact with the brass or silicon ceramic. Furthermore, in case of using physically separate nickel foil, due to great difference between the coefficients of heat expansion of the silicon ceramic and the nickel foil, the ceramic/nickel interface has large thermal stress, thus, the bond between the brass and the silicon ceramic via nickel foil is not as stable as desired. In case of using physically separate molybdenum foil, due to having a relatively low reaction activity, it is difficult for silicon ceramic and molybdenum foil to interdiffuse into each other, enhancing the difficulty of bonding the various separate intermediate layers.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary process for joining brass part and silicon carbide ceramic part, and composite article made by the process. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
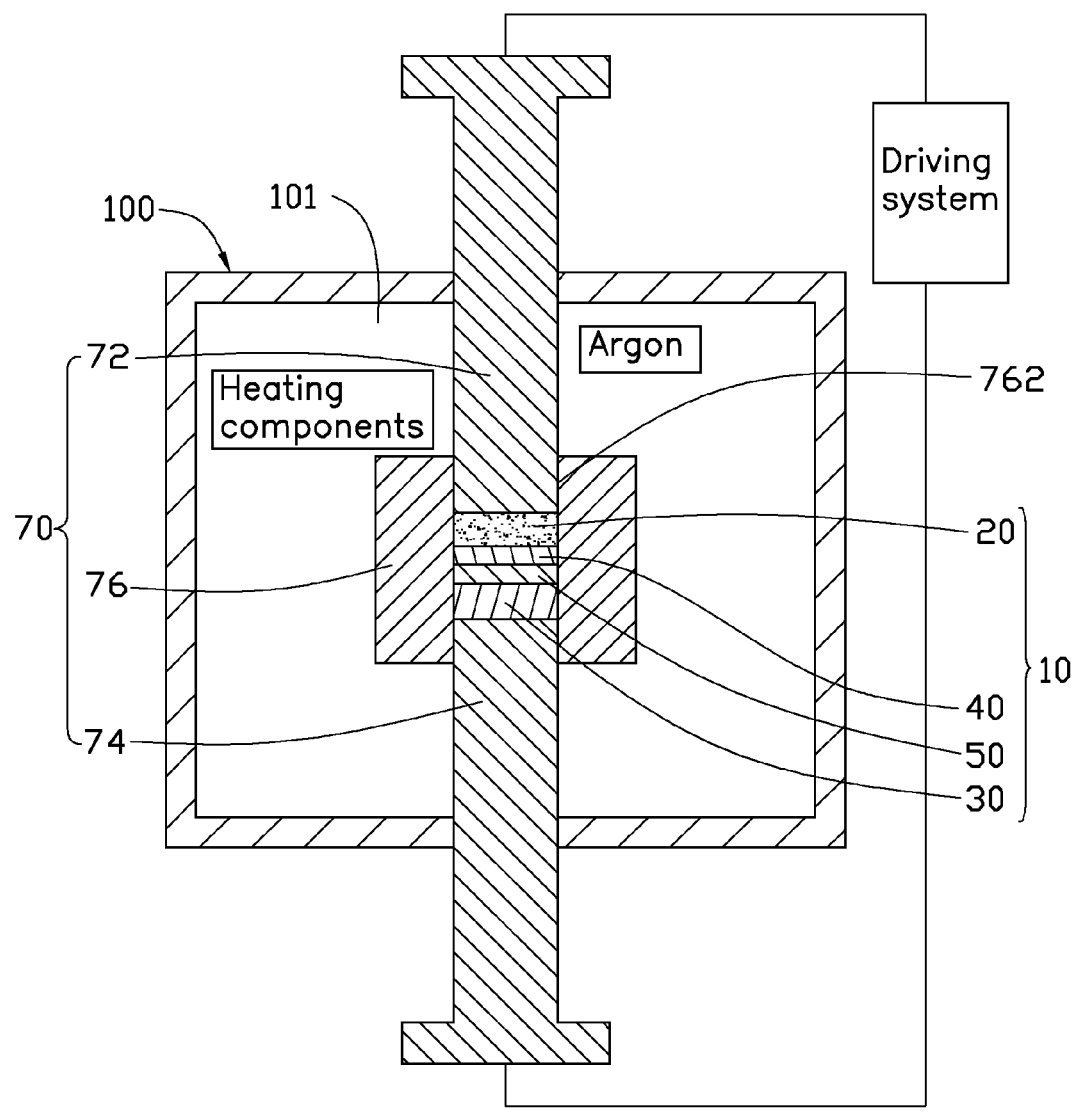
FIG. 1 is a schematic cross-sectional view of an example of a hot press sintering device for implementing the present process.

Referring to FIG. 1, an exemplary process for joining a brass part and a silicon carbide ceramic part, may includes the following steps:

A silicon carbide (SiC) ceramic part 20, a titanium (Ti) foil 40, an nickel (Ni) foil 50 and a brass part 30 are provided. The Ti foil 40 and the Ni foil 50 are used as a joining medium between the SiC ceramic part 20 and the brass part 30. Each of the Ti foil 40 and the Ni foil 50 has a thickness in a range from about 0.1 millimeter (mm) to about 0.3 mm.

The SiC ceramic part 20, the brass part 30, the Ti foil 40 and the Ni foil 50 are pretreated. The pretreatment may include the step of polishing the surfaces of The SiC ceramic part 20, the brass part 30, the Ti foil 40 and the Ni foil 50 by silicon carbide (SiC) sandpaper to produce smooth surfaces. Then, the SiC ceramic part 20, the brass part 30, the Ti foil 40 and the Ni foil 50 are cleaned by placing them into an organic solution to remove grease from their surfaces. The organic solution can be ethanol, and/or other organic solvents. Then, the SiC ceramic part 20, the brass part 30, the Ti foil 40 and the Ni foil 50 are rinsed with water and dried.

A clamping mold 70 is used to hold the SiC ceramic part 20, the brass part 30, the Ti foil 40 and the Ni foil 50. The clamping mold 70 includes a pressing board 72, a corresponding supporting board 74 and a receiving board 76. The receiving board 76 defines a cavity 762 running through the upper/bottom surface to receive the SiC ceramic part 20, the brass part 30, the Ti foil 40 and the Ni foil 50. The pressing board 72 and the corresponding supporting board 74 extend towards the cavity 762 from opposing directions and can be moved relative to the cavity 762 by a driving system such as hydraulic pressure system. The SiC ceramic part 20, the Ti foil 40, the Ni foil 50 and the brass part 30 are placed into the cavity 762 and clamped by the pressing board 72 and the corresponding supporting board 74. The Ti foil 40 and the Ni foil 50 are inserted between the SiC ceramic part 20 and the brass part 30. The Ti foil 40 abuts against the SiC ceramic part 20, and the Ni foil 50 abuts against the brass part 30. The pressing board 72 and the corresponding supporting board 74 from two opposite sides, brings the surfaces of the parts to be joined into tight contact, for compressing the SiC ceramic part 20, the Ti foil 40, the Ni foil 50 and the brass part 30.

A hot press sintering device 100 including a chamber 101 is provided. The clamping mold 70 is placed into the chamber 101. The vacuum level inside the chamber 101 is set to about $10^{-3}$ Pa to about $9 \times 10^{-3}$ Pa. Argon (Ar) is fed into the chamber 101 to maintain the chamber 101 pressure in a range of about 0.3 Mpa-0.6 MPa. The pressing board 72 and the corresponding supporting board 74 press toward each other at about 10 MPa to firmly clamp the SiC ceramic part 20 and the brass part 30. Then, the chamber 101 is heated at a rate of about 10 degrees Celsius per minute (° C./min)-50° C./min. When the temperature of the chamber 101 reaches to about 300° C., the clamping pressure applied by the boards 72,74 steadily increases, until the temperature of the chamber 101 reaches to about 650° C.-900° C., and the clamping pressure reaches to about 10 MPa-40 MPa. The pressure and heat are maintained in their respective peak ranges for about 30 min-70 min, so that the Ti foil 40 and the Ni foil 50 will chemically interact with each other, and the Ti foil 40 chemically interacts with the SiC ceramic part 20, and the Ni foil 50 chemically interacts with the brass part 30. Accordingly, the SiC ceramic part 20 and the brass part 30 are connected by the Ti foil 40 and the Ni foil 50 to form a composite article 10. The composite article 10 is removed after the chamber 101 is cooled.

Figure 2:
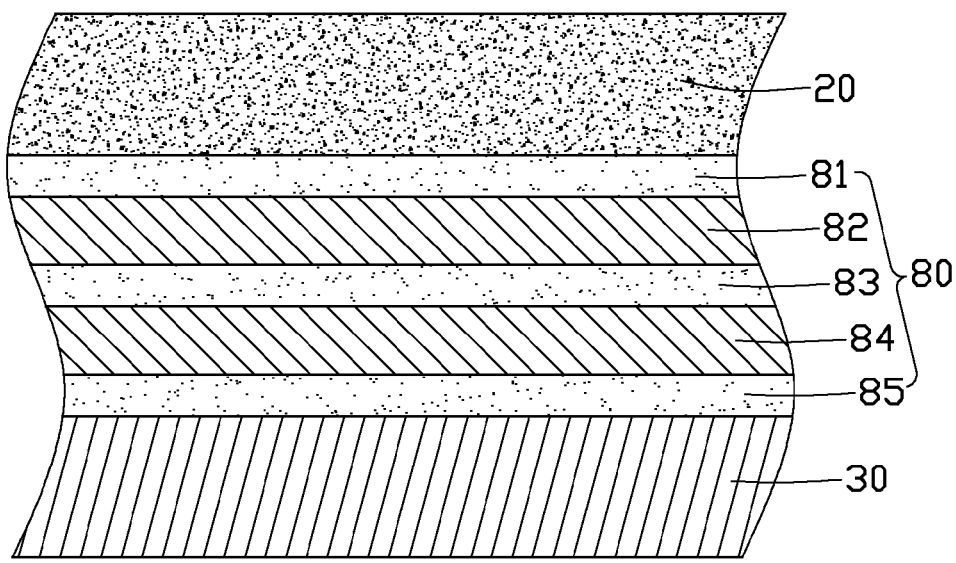
FIG. 2 is a cross-sectional view of an exemplary embodiment of the present article made by the present process.

Referring to FIG. 2, in the process of making the composite article 10, the Ti foil 40 and the Ni foil 50 act as intermediate layers to form a connecting layer 80 that connects the SiC ceramic part 20 and the brass part 30. The heat expansion rate of SiC ceramic part 20 is approximately equal to that of the Ti foil 40, thus the SiC ceramic part 20 can substantially connect with the Ti foil 40. The heat expansion rate of the brass part 30 is approximately equal to that of the Ni foil 50, thus the brass part 30 can substantially connect to the Ni foil 50. Furthermore, the combination of the Ti foil 40 and the Ni foil 50 to form the connecting layer 80 results in a connecting layer 80 having a rate of heat expansion that gradually changes from one end to the other. Therefore, the SiC ceramic part 20 is securely connected with the brass part 30 and more able to cope with temperature changes.

The composite article 10 manufactured by the present process includes the SiC ceramic part 20, the brass part 30 and a multi-layered connecting layer 80 connecting the SiC ceramic part 20 to the brass part 30. The connecting layer 80 is formed by placing the Ti foil 40 and the Ni foil 50 between the SiC ceramic part 20 and the brass part 30, and then heating and pressing the SiC ceramic part 20 and the brass part 30 as previously described. The various layers of the connecting layer 80 result from differing chemical interactions between the brass part 30, Ti foil 40, Ni foil 50, and SiC ceramic part 20. In particular, the connecting layer 80 includes:

a) a first transition layer 81: The first transition layer 81 mainly includes compounds comprising Ti element and C element, such as SiC, $Ti_2C$, etc. The compounds result from chemical reactions between adjacent portions of the SiC ceramic part 20 and Ti foil 40;

b) a Ti layer 82: The Ti layer 82 results from portions of the Ti foil 40 that do not chemically react with either the SiC ceramic part 20 or the Ni foil 50;

c) a second transition layer 83: The second transition layer 83 is located between the Ti layer 82 and the Ni layer 84. The second transition layer 83 mainly includes chemical compounds comprising Ti element and Ni element, and Ni with Ti solid solutions. The compounds and solutions result from chemical reactions between adjacent portions to the Ti foil 40 and Ni foil 50;

d) an Ni layer 84: The Ni layer 84 results from portions of the Ni foil 50 that do not chemically react with either the Ti foil 40 or the brass part 30; and e) a third transition layer 85: The third transition layer 85 is located between the Ni layer 84 and the brass layer 30 and connects the Ni layer 84 and the brass layer 30. The third transition layer 85 mainly includes chemical compounds comprising Ni element and Cu element, and Ni with Cu solid solutions. The compounds and solutions result from chemical reactions between adjacent portions to the Ni layer 84 and the brass layer 30.

The thermal expansion rate of the connecting layer 80 gradually changes from a value close to that of the SiC ceramic part 20 (in the area of first transition layer 81) to a value close to that of brass part 30 (in the area of the third transition layer 85). This results in a composite article 10 well suited to temperature changes due to the gradual, rather than abrupt, changes in its internal thermal expansion rates.

Furthermore, the connecting layer 80 of the composite article 10 has no cracks or apertures, and has a smooth surface. The composite article 10 has high hardness, high temperature resistance, corrosion resistance, abrasion resistance, shear strength in a range from about 50 MPa to about 80 MPa, and tension strength in a range from about 60 MPa to about 100 MPa.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A composite article, comprising:
a SiC ceramic part,
a brass part, and
a connecting layer that connects the SiC ceramic part to the brass part, wherein the connecting layer is formed by placing a Ti foil and a Ni foil between the SiC ceramic part and the brass part with the Ti foil abutting the SiC ceramic part and the Ni foil abutting the brass part, then heating and pressing the SiC ceramic part, the brass part, the Ti foil and the Ni foil;
wherein the connecting layer includes a first transition layer adjacent to the SiC part, a Ti layer, a second transition layer, a Ni layer, and a third transition layer adjacent to the brass part, and in that order; the third transition layer located between the Ni layer and the brass part mainly includes Ni—Cu solid solutions; and the thermal expansion rate of the connecting layer gradually changes from that of the first transition layer to that of the third transition layer.

2. The composite article as claimed in claim 1, wherein the first transition layer located between the SiC ceramic part and the Ti layer mainly includes compounds comprising Ti element and C element.

3. The composite article as claimed in claim 2, wherein the compounds include SiC and $Ti_2C$.

4. The composite article as claimed in claim 1, wherein the second transition layer located between the Ti layer and the Ni layer mainly includes compounds comprised of Ti element and Ni element, and Ni-Ti alloy solid solutions.

5. A composite article, comprising:
a SiC ceramic part, a brass part, and
a multi-layered connecting layer that connects the SiC ceramic part to the brass part, wherein the connecting layer comprises:
a first layer adjacent to the SiC part, the first layer having a thermal expansion rate close to that of the SiC part and comprising results of chemical reactions between SiC and Ti;
a second layer, adjacent to the first layer and comprising Ti;
a third layer, adjacent to the second layer and comprising results of chemical reactions between Ti and Ni;
a fourth layer, adjacent to the third layer and comprising Ni; and
a last layer adjacent to the brass part and the brass part, the last layer having a thermal expansion rate close to that of the brass part and comprising results of chemical reactions between Ni and brass; and
the thermal expansion rate of the connecting layer gradually changes from that of the first layer to that of the last layer.

* * * * *